US006885339B2

(12) United States Patent
Jocher

(10) Patent No.: US 6,885,339 B2
(45) Date of Patent: Apr. 26, 2005

(54) DISCRETE RADIATION SOURCE LOCATION

(75) Inventor: Ronald W. Jocher, East Hanover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/448,578

(22) Filed: May 30, 2003

(65) Prior Publication Data

US 2004/0239563 A1 Dec. 2, 2004

(51) Int. Cl.[7] .............................. G01S 1/24; G01S 3/02
(52) U.S. Cl. ..................................... 342/387; 342/465
(58) Field of Search .............................. 342/458, 387, 342/465

(56) References Cited

U.S. PATENT DOCUMENTS

| 4,339,755 A | | 7/1982 | Wright ........................ 342/458 |
| 5,045,860 A | * | 9/1991 | Hodson ....................... 342/451 |
| 6,172,640 B1 | | 1/2001 | Durst et al. |
| 6,236,358 B1 | | 5/2001 | Durst et al. |
| 6,310,576 B1 | | 10/2001 | Johnson ....................... 342/465 |
| 6,373,434 B1 | | 4/2002 | Hayakawa ................... 342/387 |
| 6,421,001 B1 | | 7/2002 | Durst et al. |
| 6,489,922 B1 | * | 12/2002 | Lin et al. ................ 342/357.14 |
| 6,583,761 B1 | * | 6/2003 | Angermeier et al. ......... 342/432 |
| 6,700,535 B1 | | 3/2004 | Gilkes et al. ................ 342/387 |
| 2004/0017313 A1 | | 1/2004 | Menache ..................... 342/465 |

FOREIGN PATENT DOCUMENTS

| WO | WO 00/49425 A1 | * | 8/2000 | ............. G01S/5/04 |
| WO | WO 00/70365 A1 | * | 11/2000 | ............. G01S/5/12 |

* cited by examiner

Primary Examiner—Gregory C. Issing

(57) ABSTRACT

A radiation source location technique includes focusing a plurality of receivers (i.e., antennas) at the same location. At least one determined characteristic of the radiation received at each receiver provides information regarding the source of that radiation relative to each receiver. Determining a relationship between the determined characteristics allows for determining when the source of radiation is at the location where the receivers are focused. One example includes using high directivity, narrow beamwidth antennas and time based markers from a wireless digital communication signal for locating a mobile unit source of radiation.

16 Claims, 1 Drawing Sheet

DISCRETE RADIATION SOURCE LOCATION

FIELD OF THE INVENTION

This invention generally relates to locating at least one source of radiation.

DESCRIPTION OF THE RELATED ART

There are various situations where detecting a source of radiation and locating that source is useful. One such example situation occurs in a testing environment where a plurality of mobile stations (i.e., cell phones) are within a relatively confined area. There may be instances where one or more of the mobile stations is emitting RF signals or otherwise acting as a leak of radiation. Such radiation may interfere with the ability to test signals from other nearby mobile stations. It is desirable to be able to specifically locate which of the mobile stations is emitting this potentially interfering radiation so that the source can be eliminated or otherwise dealt with as needed.

Another situation where specific source identification and location information may be desirable is where a signal from a mobile station is a possible source for locating an individual that is lost or otherwise unable to describe their location when it is desirable to physically reach that individual. There are a variety of such scenarios where specifically being able to locate the source of a signal such as that sent by a mobile station would facilitate more quickly locating the individual and providing assistance as may be needed.

There is a need for an improved arrangement for specifically locating a discrete source of radiation such as radio frequency communication signals. This invention addresses that need.

SUMMARY OF THE INVENTION

In general terms, this invention is a method of specifically locating a discrete source of radiation.

In one example a plurality of receivers are focused at the same location. A characteristic of radiation received by each of the receivers when they are focused at the same location is determined. The characteristic of the received radiation at each receiver is then used to determine whether the receivers are currently focused at the location of the source of radiation.

Known or determinable relationships between the receivers and the focused location are used to determine an expected relationship between the received signal characteristics that indicate when the receivers are focused.

In one example, timing information from the received signal is used as the characteristic to indicate when the source of radiation has been located. In the case where a digital signal from a mobile station is the received signal, the code channel phase and pilot signal relationship are used to determine the exact location of the signal source.

An example system designed according to this invention includes at least two receivers that are focused at the same location. The receivers are moveable so that the focus of each receiver tracks the other during a scanning procedure. A controller controls the focused position of the receivers to remain coincident during a scanning procedure. The controller utilizes information regarding the signals received at each receiver to determine when the location at which the receivers are focused is the location of the source of radiation.

In one example, high directivity, high gain, narrow beamwidth antennas are used as the receivers.

The various features and advantages of this invention will become apparent to those skilled in the art from the following detailed description. The drawings that accompany the detailed description can be briefly described as follows.

DETAILED DESCRIPTION

Figure 1:
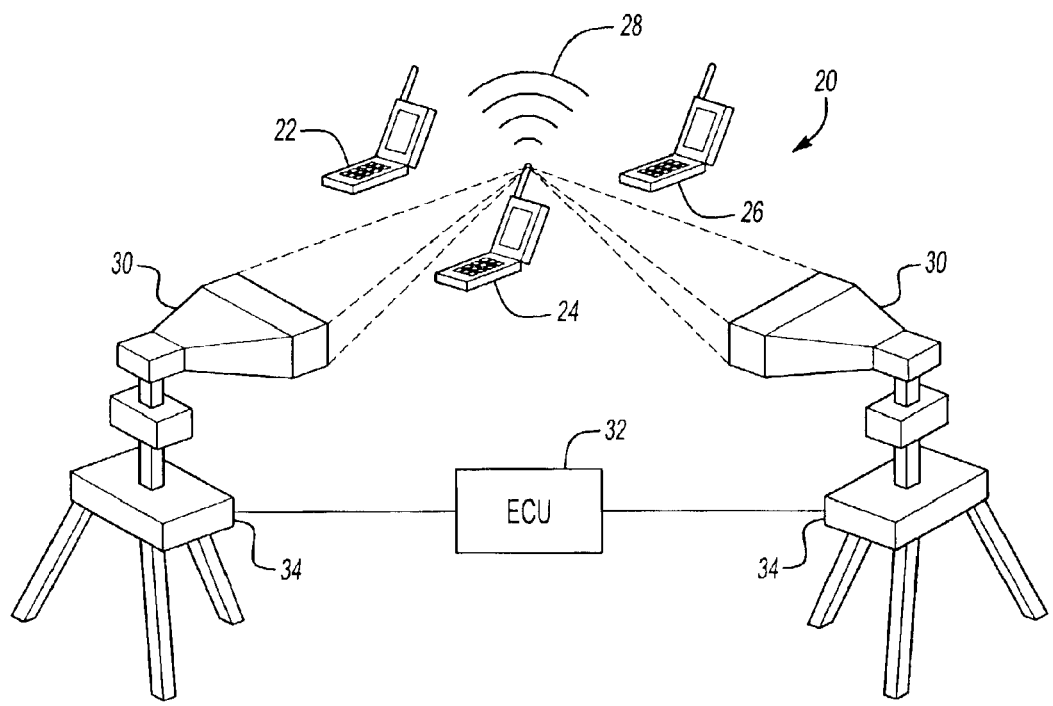
FIG. 1 schematically illustrates selected portions of a system designed according to an embodiment of this invention.

FIG. 1 schematically illustrates a radiation source detection system 20 that is capable of obtaining exact location information regarding a discrete source of radiation. The example arrangement is shown in use for locating at least one of several mobile stations 22, 24 and 26 (i.e., cell phones) that are located in relatively close proximity to each other. Of course, this invention is not limited to a particular type or source of radiation. This example implementation of this invention is particularly useful for locating a mobile station such as a cell phone and, therefore, much of this discussion will be directed to such a situation. The invention is not limited to only such arrangements, however.

In FIG. 1, the mobile station 24 is emitting a signal 28, which comprises radio frequency radiation. More particularly, the example radiation 28 from the mobile station 24 comprises a wireless radio frequency communication signal.

The system 20 includes a plurality of receivers 30 that are capable of detecting the signal 28. In one example, the receivers 30 comprise high gain, high directivity, narrow beamwidth antennas.

A controller 32 communicates with the receivers 30 in a manner that the controller 32 is able to determine at least one characteristic of the radiation received by each of the receivers 30. The controller 32 also controls positioning devices 34 associated with each of the receivers 30 to precisely locate the focus of each receiver at the same location.

The positioning devices 34 in one example comprise conventional components that allow for automatically positioning the receivers 30 in an orientation such that the focal point of each receiver (i.e., antenna) is known and at the same location as the other receiver(s). For example, the controller 32 knows or determines the azimuth or angle and elevation information regarding the orientation of each receiver based on information regarding the status of the positioning devices 34. In one example, the controller 32 uses a global positioning database to specifically identify the location at which the receivers are focused.

The controller 32 utilizes at least one characteristic of the radiation received by each receiver and determines a relationship between the received characteristics to determine when the receivers 30 are focused at the location of the source of radiation. Depending on the source of interest and the radiation or signal of interest, a variety of strategies for making the location determination can be used with a system designed according to an embodiment of this invention. Given this description, those skilled in the art will be able to choose appropriate hardware, firmware, software or a combination of them to realize a controller that is properly programmed to meet the needs of their particular situation.

In one example where the source of radiation is a mobile station such as the mobile station 24, timing codes of the digital wireless communication signal 28 provide a determinable characteristic of the received radiation at each receiver that allows the controller 32 to make the location determination. For example, the timing codes of a wireless communication digital signal allow for determining the distance between each receiver 30 and the source 26 of the radiation 28 received by each receiver 30. This distance information can then be combined with the knowledge of the distance of the focal point of the receivers 30 relative to each receiver. In the event that the determined distance between each receiver and the source of radiation corresponds to the respective distances between the receivers and the focal points, the controller 32 determines that the receivers are focused at the location of the source of radiation. In one example, time-based markers within a wireless digital communication signal are used to verify the distance determinations.

When the focal point of the receivers is equidistant from both receivers, the time based markers preferably match when comparing one receiver with another.

Another example utilizes code channel phase information and pilot signal information from a received signal to make a distance determination. Known relationships between code channel phase and pilot signal information provides the controller 32 with the ability to make a distance determination regarding a source of received radiation at each of the receivers 30.

When the current focal point of the receivers is not equidistant from each of the receivers, the expected differences, based upon the different distances from the focal point, preferably are factored in and used in the source location determination process. Those skilled in the art who have benefit of this description will realize how to adapt such relationships to meet the needs of a particular embodiment.

In another example, an analog signal is received by each of the receivers 30. There is a propagation time (i.e., delay) associated with the radiation received at each receiver. Given the propagation time information, the controller 32 determines the distance between the source of radiation and each receiver to determine whether the receivers are currently both focused at the location of the source of radiation. The azimuth and elevation information regarding the orientation of the receivers provides the ability to make exact distance measurements.

In some situations, there may be interference or an unusually large source of radiation such that signal scattering is apparent from the radiation received by the receivers 30. For example, there may not be an exact match between the time-based markers at each of the receivers in an example where a digital wireless communication signal is the received radiation. In such situations, at least one example embodiment utilizes a plurality of locations that indicate a possible source location and utilizes an average or a "center of gravity" of those locations as the determined location of the source of information.

Figure 2:
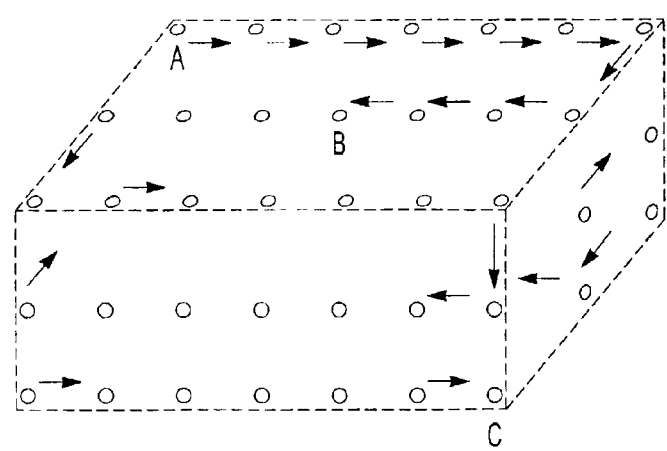
FIG. 2 schematically illustrates a scanning technique useful for one implementation of the embodiment of FIG. 1.

FIG. 2 schematically illustrates one scanning technique useful with an example embodiment of this invention. The receivers 30 are initially focused at a location A and the controller 32 determines whether that is the location of the source of radiation 28. The positioning devices 34 respond to commands from the controller 32 in one example so that the focus of each receiver moves in a grid-like pattern throughout a selected scanning area in increments that are selected to meet the needs of a given situation. For example, exact location information within one meter may require larger increments compared to location information that is required within inches or millimeters. By tracking the receivers to keep their focus coincident at a plurality of search locations, an entire area may be scanned until the source of radiation is located.

In FIG. 2 beginning at the location A and moving to the right (according to the drawing) a chosen number of search locations and then moving back to the left (according to the drawing) four increments results in arriving at the location B. In this examples, the mobile station 24 is at the location B is the location of the mobile station the controller 32 determines that the location B is the location of the mobile station 24, which is the source of received radiation 28.

As can be appreciated from FIG. 2, a search pattern in a variety of directions can be followed to scan through an entire three-dimensional area bounded as required to meet the needs of a particular situation. One example search pattern follows the illustrated arrows indicating a path beginning at the location A and ending at the location C.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of locating a source of radiation, comprising:
    determining a characteristic of radiation received from each of a plurality of receivers if the receivers are focused at a location such that focal points of the receivers are coincident; and
    determining whether the source is at the location based upon a relationship between the determined characteristics wherein the received radiation comprises a wireless digital signal and the determined characteristic includes a timing code.

2. The method of claim 1, including using the determined characteristics to determine a distance between the source of the received radiation and the respective receivers.

3. The method of claim 2, including using time-based markers from the received signal to verify the determined distances.

4. The method of claim 1, including scanning a selected area by moving the location at which the receivers are coincidently focused in a selected pattern in the area.

5. The method of claim 1, including using global positioning information regarding the location at which the receivers are focused to thereby locate the source of radiation.

6. The method of claim 1, comprising locating the source when the source is at the location of the coincident focal points.

7. A method of locating a source of radiation, comprising:
    determining a characteristic of radiation received from each of a plurality of receivers if the receivers are focused at a location such that focal points of the receivers are coincident; and
    determining whether the source is at the location based upon a relationship between the determined characteristics wherein the received radiation comprises a wireless digital signal and the determined characteristic includes code channel phase information.

8. The method of claim 7, wherein the determined characteristic includes pilot signal information and including determining a distance between the source of the received radiation and the respective receivers.

9. The system for locating a source of radiation, comprising:

a plurality of receivers focused at a location such that focal points of the receivers are coincident; and a controller that determines at least one characteristic of radiation received at each receiver and that determines whether the source of radiation received by each receiver is at the location where the receivers are focused wherein the received radiation comprises a wireless digital signal and the controller determine a timing code associated with each received signal.

10. The system of claim 9, wherein the receivers comprises high directivity, narrow beamwidth antennas.

11. The system of claim 9, including position controllers associated with each of the receivers and wherein the controller controls the position controllers to focus each receiver at the same location and wherein the position controllers respond to the controller to automatically move the receivers in a selected pattern to scan a selected area.

12. The system of claim 9, wherein the controller uses the timing codes to determine a distance between the source of the received radiation and the respective receivers.

13. The system of claim 12, wherein the controller uses time-based markers from the received signal to verify the determined distances.

14. The system of claim 9, wherein the controller locates the source of radiation when the source of radiation is at the location of the coincident focal points.

15. A system for locating a source of radiation, comprising:

a plurality of receivers focused at a location such that focal points of the receivers are coincident; and a controller that determines at least one characteristic of radiation received at each receiver and that determines whether the source of radiation received by each receiver is at the location where the receivers are focused wherein the received radiation comprises a wireless digital signal and the controller determines code channel phase information associated with each received signal.

16. The system of claim 15, wherein the controller determines pilot signal information associated with the received signals and determines a distance between the source of the received radiation and the respective receivers.

* * * * *